(12) United States Patent
Cha

(10) Patent No.: US 6,806,609 B2
(45) Date of Patent: Oct. 19, 2004

(54) SINGLE PHASE INDUCTION MOTOR AND HERMETIC RECIPROCAL COMPRESSOR HAVING A SINGLE PHASE INDUCTION MOTOR

(75) Inventor: Hyun-rok Cha, Gwangju (KR)

(73) Assignee: Samsung Gwangju Electronics Co., Ltd., Gwangju (KR)

(*) Notice: Subject to any disclaimer, the term of this patent is extended or adjusted under 35 U.S.C. 154(b) by 0 days.

(21) Appl. No.: 10/156,586

(22) Filed: May 28, 2002

(65) Prior Publication Data

US 2003/0146669 A1 Aug. 7, 2003

(30) Foreign Application Priority Data

Feb. 6, 2002 (KR) .......................................... 2002-6666

(51) Int. Cl.[7] .......................... H02K 1/00; H02K 19/26; H02K 21/00
(52) U.S. Cl. ........................ 310/179; 310/180; 310/181; 310/184; 310/160; 310/168
(58) Field of Search ................................ 310/179, 180, 310/181, 184, 160–168

(56) References Cited

U.S. PATENT DOCUMENTS

| | | | | |
|---|---|---|---|---|
| 1,326,502 A | * | 12/1919 | Hentzell ...................... 310/180 |
| 2,810,846 A | * | 10/1957 | Hammestrom .............. 310/172 |
| 2,995,672 A | * | 8/1961 | Johnson ...................... 310/180 |
| 3,619,730 A | * | 11/1971 | Broadway et al. .......... 318/776 |
| 3,809,937 A | * | 5/1974 | Koike ......................... 310/184 |
| 3,984,711 A | * | 10/1976 | Kordik ...................... 310/49 R |

FOREIGN PATENT DOCUMENTS

JP 55155562 A * 12/1980 .......... H02K/17/08

\* cited by examiner

Primary Examiner—Burton S. Mullins
Assistant Examiner—J. Aguirrechea
(74) Attorney, Agent, or Firm—Ladas & Parry

(57) ABSTRACT

A single phase induction motor and a compressor utilizing the single phase induction motor wherein the motor has a stator having a plurality of slots; a rotor being rotated by a magnetic field generated by an electric force between the stator and the rotor; and a main winding and a sub winding wound through the plurality of slots of the stator to form a revolving magnetic field of the rotor. The main winding and the sub winding form a centralized type of winding structure so that the main winding and the sub winding are wound in an alternate pattern via adjacent slots. Since the centralized winding structure of the main winding and the sub winding which are wound through the slots of the stator, the coil end is greatly reduced, and as a result, the material costs and copper loss can be greatly reduced. Further, the main winding and the sub winding, which are wound through the slots of the stator, do not protrude from opposite sides of the stator too much. Accordingly, processes like forming, lacing and cleaning for tidying up the protruded portion of the main winding and the sub winding, can be omitted, thereby simplifying the manufacturing process.

16 Claims, 7 Drawing Sheets

SINGLE PHASE INDUCTION MOTOR AND HERMETIC RECIPROCAL COMPRESSOR HAVING A SINGLE PHASE INDUCTION MOTOR

BACKGROUND OF THE INVENTION

1. Field of the Invention

The present invention relates generally to a single phase induction motor, and more particularly, to a single phase induction motor having a centralized winding structure for use with a hermetic reciprocal compressor.

2. Description of the Related Art

A hermetic reciprocal compressor, as shown in FIG. 1, includes a sealed casing 10, an electronic device unit 20 formed in the sealed casing 10 to serve as a driving source, and a compression device unit 30 for compressing refrigerant with linear reciprocal movement by the driving force of the electronic device unit 20.

The electronic device unit 20 has a single-phase induction motor. The rotational driving force of the electronic device unit 20 is converted into the linear reciprocal movement of the compression device unit 30 by a crank device that has an eccentric shaft 31 and a connecting rod 32. The compression device unit 30 has a cylinder block 33 and a piston 35 that slides longitudinally within a bore of the cylinder block 33. One end of the piston 35 is connected to a connecting rod 32 such that the piston 35 is reciprocated within the bore of the cylinder block 33 in a linear direction in association with the rotational driving of the eccentric shaft 31, to thereby draw and compress the refrigerant.

The single-phase induction motor has a stator and a rotor that is rotated by the revolving magnetic field of the electric force generated between the stator and the rotor. On the stator, a main winding and a sub winding are wound around a polar axis of an electric angle 90°.

When alternating current (AC) power is supplied to the main winding and the sub winding from a power source (not shown), the sub winding, which is positioned ahead of the main winding by the electrical angle of 90°, is first subjected to the rotational force caused by the revolving magnetic field generated by the electric current. Since the current phase of the sub winding is ahead of the current phase of the main winding due to a capacitor connected in series with the sub winding, the rotor is caused to rotate at a high speed.

FIG. 2 is an exploded perspective view of the single-phase induction motor used in a conventional compressor, and FIG. 3 is a longitudinal sectional view of the single-phase induction motor of FIG. 2 being assembled, in which reference numeral 21 denotes the stator, 22 the rotor, and 23 and 24 the main winding and the sub winding, respectively.

As shown in FIGS. 2 and 3, twenty-four (24) stator slots 21a are formed along an inner circumference of the stator in a manner such that the slots 21a are spaced from each other by a predetermined distance. A plurality of rotor slots 22a are also formed in the rotor 22 at a predetermined distance from each other. The main winding 23 and the sub winding 24 are wound through the stator slots 21a, while there also is a winding or a permanent magnet (not shown) wound through or inserted into the rotor slots 22a.

FIG. 4 illustrates an order by which the main winding 23 and the sub winding 24 are wound through the twenty-four stator slots 21a of the conventional single phase induction motor. As illustrated, the conventional single phase induction motor has the winding structure of a distributed winding—so called concentric winding for the main winding 23 and the sub winding 24.

In the distributed winding, the main winding 23 enters into the fourteenth slot (14th), and passes through the eleventh (11th), fifteenth (15th), tenth (10th), sixteenth (16th), ninth (9th), seventeenth (17th), eighth (8th), eighteenth (18th) and seventh (7th) slots and then re-enters into the twenty-third (23rd) slot, before passing through the second (2nd), twenty-second (22nd), third (3rd), twenty-first (21st), fourth (4th), twentieth (20th), fifth (5th), nineteenth (19th), and sixth (6th) slots, and then is drawn out. The sub winding 24 enters into the twelfth slot (12th), and passes through the first (1st), eleventh (11th), second (2nd), tenth (10th), third (3rd), ninth (9th), and fourth (4th) slots, and then re-enters into the thirteenth (13th) slot, before passing through the twenty-fourth (24th), fourteenth (14th), twenty-third (23rd), fifteenth (15th), twenty-second (22nd), sixteenth (16th), and twenty-first (21st) slots and then is drawn out.

In the conventional single phase induction motor, the main winding 23 and the sub winding 24 of the stator 21 are concentrically wound through the slots in an outward or inward direction, inevitably requiring an increased length of the coil end and subsequent cost increases and excessive use of copper.

In addition to the problem of increased length of the coil end due to the distributed winding structure of the main winding 23 and the sub winding 24, the conventional single phase induction motor also has a problem caused due to the structure in which the winding protrudes from opposing sides of the stator 21. That is, since the winding protrudes from the opposite sides of the stator 21, additional processes like forming, lacing and cleaning are required for the purpose of tidying up the winding, and as a result,productivity deteriorates due to the increased manufacturing processes and other resulting difficulties.

Further, since the main winding 23 and the sub winding 24 each protrude from opposite sides of the stator 21, the size of compressor inevitably unnecessarily increases.

SUMMARY OF THE INVENTION

The present invention overcomes the above-mentioned problems of the prior art. Accordingly, it is an object of the present invention to provide a single-phase induction motor having a shortened coil end, which is achieved by a centralized winding structure in which a main winding and a sub winding are wound through slots adjacent to each other, and is thus capable of reducing material costs and excessive use of copper.

Yet another object of the present invention is to provide a single-phase induction motor having a centralized winding structure in which the main winding and the sub winding are directly wound through slots adjacent to each other, requiring no separate processes like forming, lacing and cleaning for tidying up a protruded winding because the winding does not protrude, and is thus easy to manufacture.

Yet another object of the present invention is to provide a hermetic reciprocal compressor, which is smaller due to the compact-size of the single-phase induction motor.

The above objects are accomplished by a single-phase induction motor according to the present invention, including a stator having a plurality of slots; a rotor rotated by a magnetic field generated by an electric force between the stator and the rotor; and a main winding and a sub winding wound through the plurality of slots of the stator to form a revolving magnetic field on the rotor. The main winding and the sub winding form a centralized type of winding structure so that the main winding and the sub winding are wound in an alternate pattern via adjacent slots according to a certain rule which will be further described.

Since the main winding and the sub winding are wound through the slots of the stator in this centralized winding structure, the coil end length is greatly reduced, and as a result, the material costs and copper loss can also be reduced greatly.

Further, according to the present invention, the main winding and the sub winding, are wound through the slots of the stator, and do not protrude from opposite sides of the stator too much. Accordingly, processes like forming, lacing and cleaning to tidy up the protruded portion of the main winding and the sub winding, can be omitted, and therefore, the manufacturing process becomes simplified.

According to the preferred embodiment of the present invention, the stator has sixteen slots, and the main winding is inserted into slot (1a) of the stator, then passed consecutively through slots (2b), (4f), (3e), (5i), (6j), (8n), (7m), and then drawn out, while the sub winding is inserted into slot (2c) of the stator, then passed consecutively through slots (3d), (5h), (4g), (6k), (7l), (8o), (1p), and then drawn out.

The main winding is also inserted into slot (1a) of the stator, then passed consecutively through slots (2b), (2c), (3d), (7l), (6k), (6j), (5i), and then drawn out, while the sub winding is inserted into slot (7m) of the stator, then passed consecutively through slots (8n), (8o), (1p), (5h), (4g), (4f), (3e), and then drawn out.

Also, the main winding is inserted into slot (1a) of the stator, then passed consecutively through slots (2b), (2c), (3d), (3e), (4f), (8n), (7m), (7l), (6k), (6j) and (5i), and then drawn out, while the sub winding is inserted into slot (3e) of the stator, then passed consecutively through slots (4f), (4g), (5h), (5i), (6j), (2b), (1a), (1p), (8o), (8n), (7m) and then drawn out.

In order to generate a magnetic field from the electric force of the stator, a winding or a permanent magnet can be wound into, or inserted into the plurality of slots of the rotor that penetrate through the rotor.

The rotor can have skews formed at a pitch identical to a pitch of the slots of the stator, for reducing harmonic waves, noise and vibration. Each skew of the rotor is in the shape of the alphabet symbols 'I' or 'V'.

Meanwhile, another object of the present invention can be achieved by a hermetic reciprocal compressor according to the present invention, which utilizes the single-phase induction motor as described above. Since the main winding and the sub winding do not protrude from the opposite sides of the stator too much, the size of the compressor can be reduced.

BRIEF DESCRIPTION OF THE DRAWINGS

The above-mentioned objects and features of the present invention will be more apparent by describing the preferred embodiment of the present invention by referring to the appended drawings, in which.

DETAILED DESCRIPTION OF THE PREFERRED EMBODIMENT

The preferred embodiments of the present invention will be described below in greater detail by referring to the appended drawings.

Figure 5:
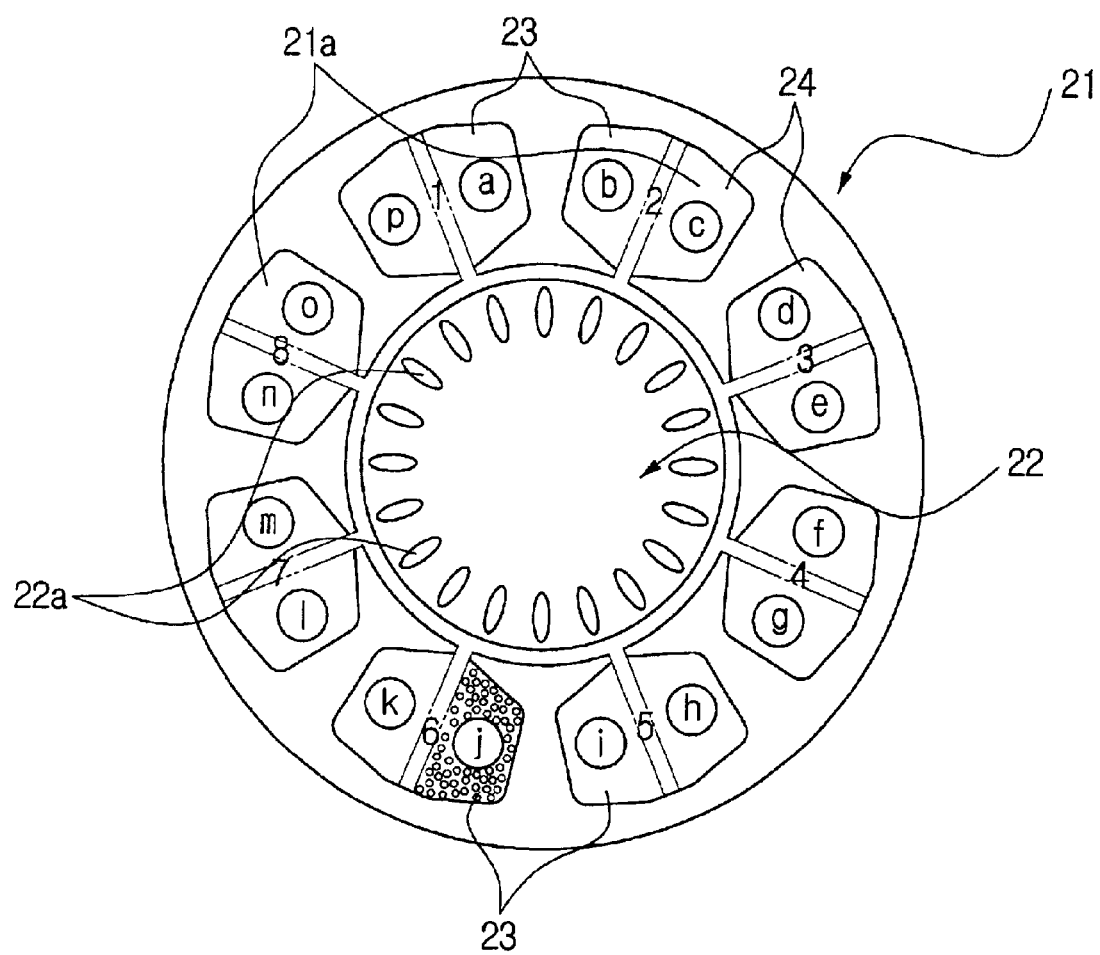
FIG. 5 is a longitudinal sectional view showing a single phase induction motor for use in a compressor according to a first preferred embodiment of the present invention.
Figure 6:
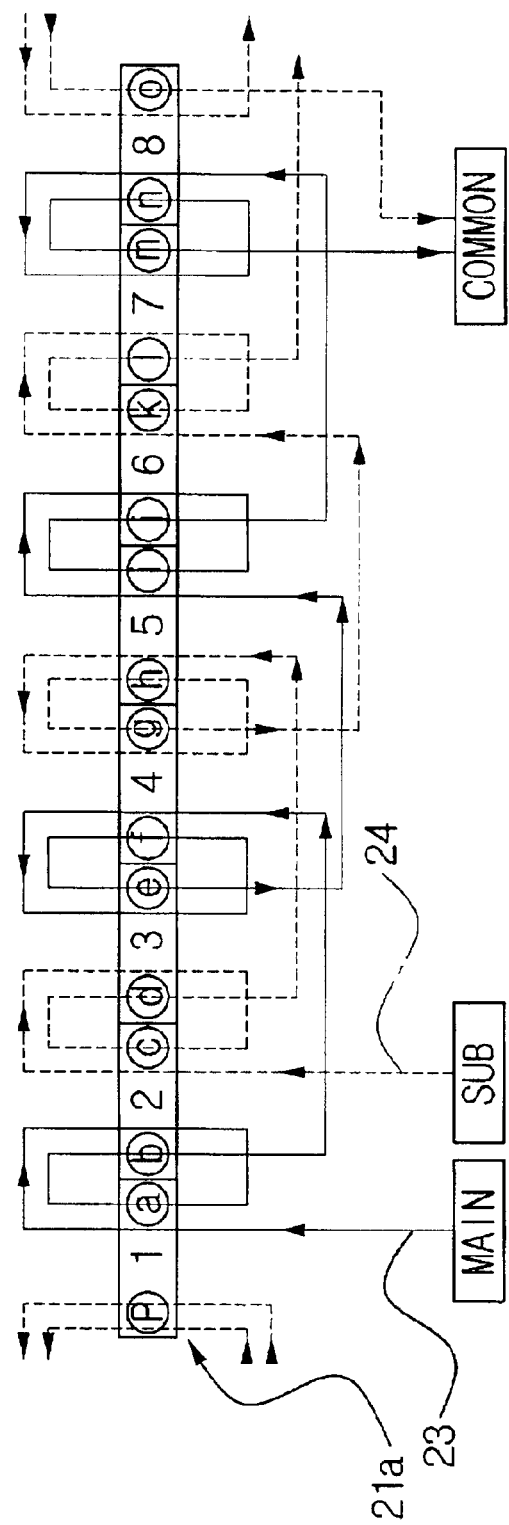
FIG. 6 is a diagram explaining a method of winding in a stator of the single-phase induction motor for use in the compressor shown in FIG. 5.

FIG. 5 is a longitudinal sectional view showing a single phase induction motor for use in compressor according to a first preferred embodiment of the present invention, and FIG. 6 is a diagram explaining a method of winding in a stator of the single phase-induction motor for use in compressor of FIG. 5.

As shown in FIGS. 5 and 6, the single-phase induction motor of the compressor according to the first preferred embodiment of the present invention has a stator 21, a rotor 22, a main winding 23 and a sub winding 24.

The stator 21 is constructed as a plurality of iron sheets that are stacked one on top of the other. Each iron sheet has a plurality of slots 21a, and an opening formed in the center to receive the rotor 22. The stator 21 can be formed in any shape such as a disc, or in a rectangular shape. Although this embodiment shows the stator 21 having sixteen slots 21a as a way of example, the number of slots 21a can be varied, that is to say to four, eight, twelve, etc., according to the application for use of the motor.

Figure 1:
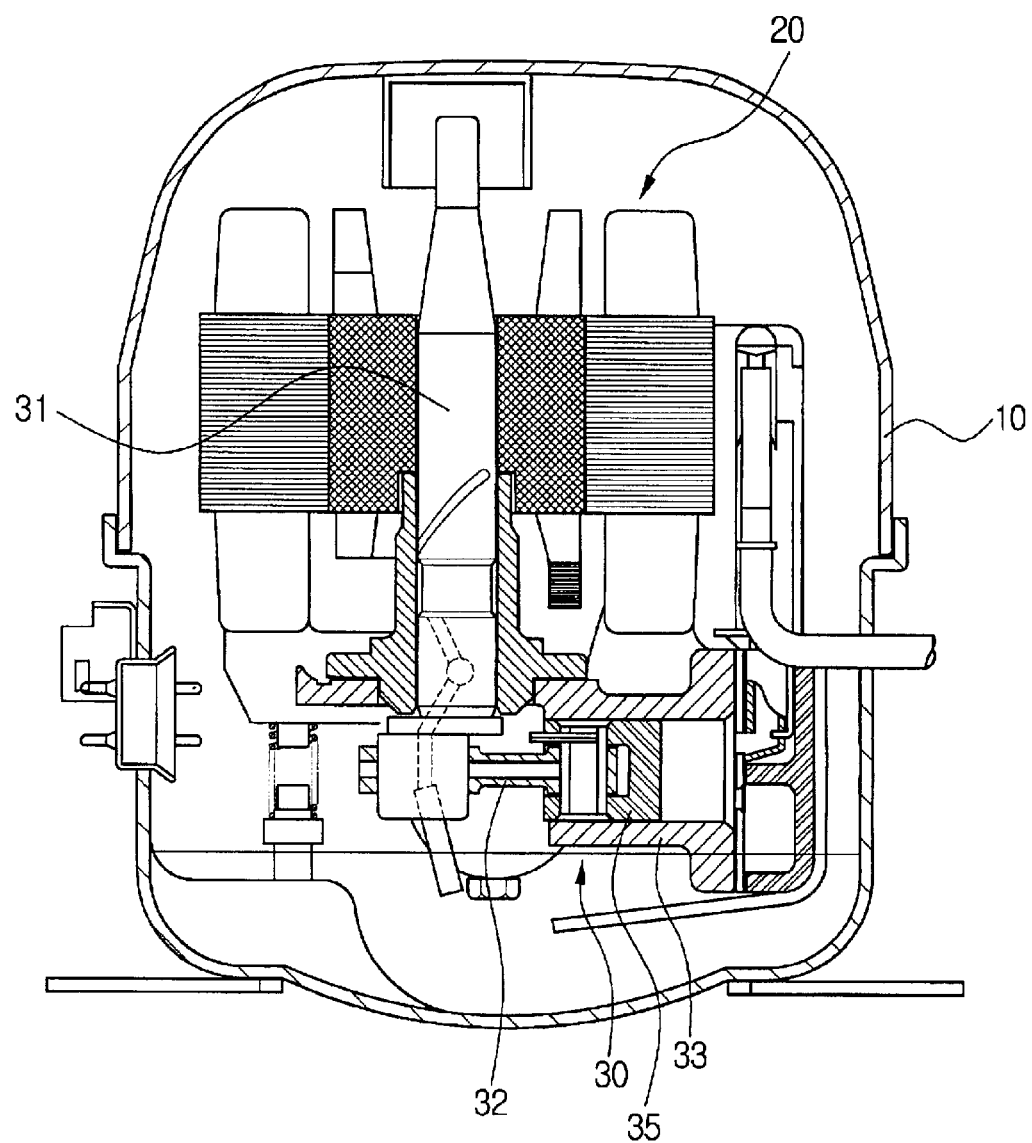
FIG. 1 is a sectional view showing a conventional hermetic reciprocal compressor.
Figure 2:
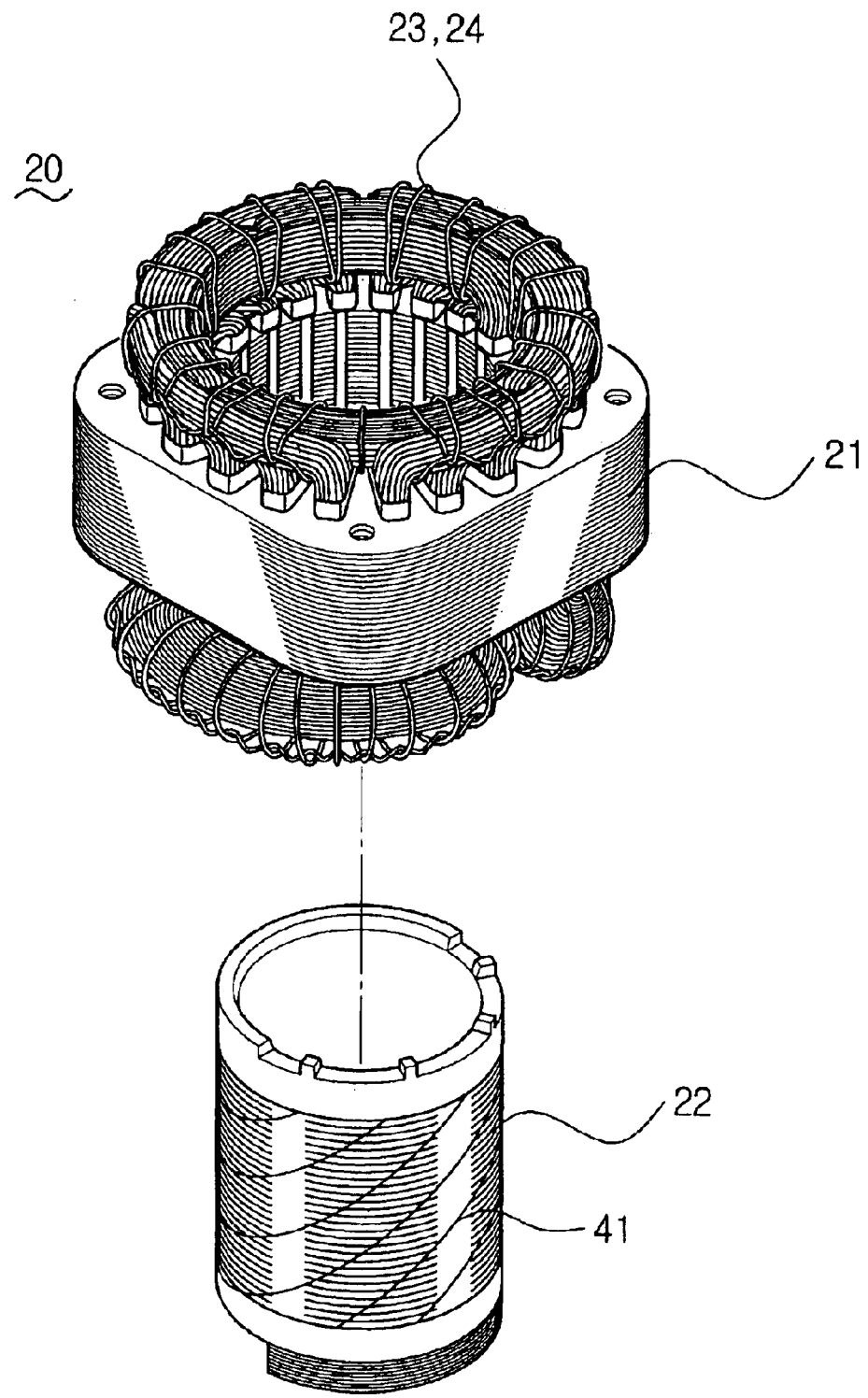
FIG. 2 is an exploded perspective view of a single-phase induction motor for use in the compressor of FIG. 1.
Figure 3:
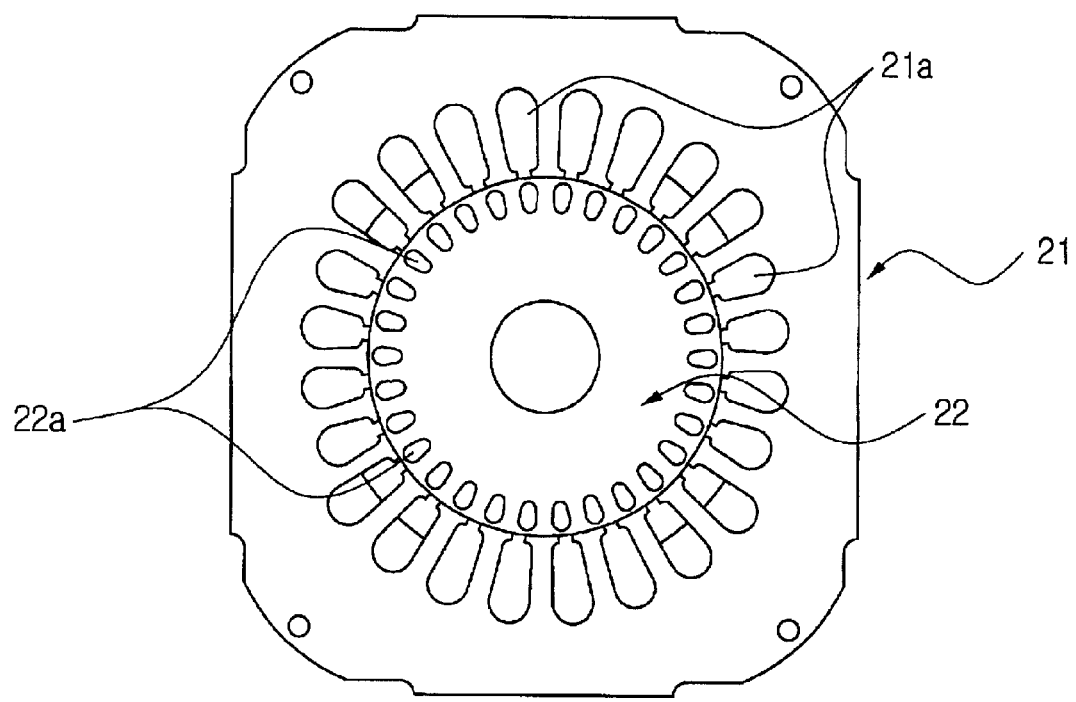
FIG. 3 is a longitudinal sectional view of the single-phase induction motor of FIG. 2.
Figure 4:
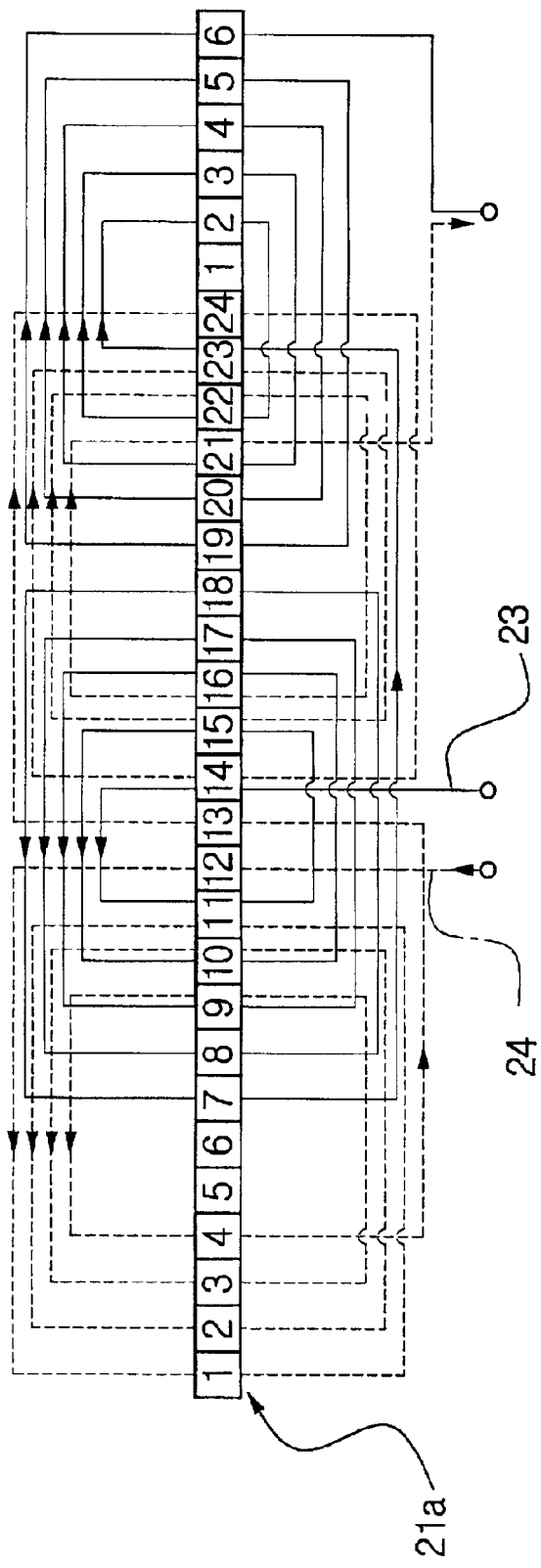
FIG. 4 is a diagram explaining a method of winding in a stator of the conventional single phase induction motor.

The rotor 22 is disposed in an inner or central space of the stator 21, while maintaining a proper clearance between the stator and the rotor, and is rotated by a magnetic field generated by the electric force between the stator 21 and the rotor 22. The rotor 22 may be constructed in a similar way as that of the stator 21, i.e., the rotor 22 can be constructed by stacking a plurality of iron sheets onto each other. Or, the rotor 21 can be integrally formed by aluminum die-casting. In any case, the rotor 22 has a plurality of slots 22a penetrating the rotor 22 in a vertical direction, and a means for generating a magnetic field from the interaction with the electric force of the stator 21, such as a winding or a permanent magnet disposed in the slots 22a. This embodiment shows the case in which a winding is wound in the slots 22a of the rotor 22. As shown in FIG. 2, the rotor 22 can also have a skew 41 for the purpose of harmonic wave reduction and noise/vibration reduction. The skew 41 is made at the identical pitch as that of the slots 21a of the stator 21, in the shape of the alphabet symbols 'I' or 'V'.

The main winding 23 and the sub winding 24 are wound through the plurality of slots 21a of the stator 21, to form a revolving magnetic field on the rotor 22, and it is a unique feature of the present invention that the main winding 23 and the sub winding 24 are wound to a centralized winding structure in which the main winding 23 and the sub winding 24 are alternatively wound through corresponding slots 21a of the stator 21 in a manner such that the main winding 23 and the sub winding 24 are passed through adjacent slots by a certain rule described in greater detail below.

More specifically, and as shown in FIG. 6, the main winding 23 of the single-phase induction motor for use in a compressor according to the present invention is inserted into slot (1a) of the stator 21, then wound consecutively through slots (2b), (4f),(3e), (5i), (6j), (8n), (7m, and then drawn out, while the sub winding 24 is inserted into slot (2c) of the stator 21, then wound consecutively through slots (3d), (5h), (4g), (6k), (7l), (8o) (1p), and then drawn out.

In the centralized winding structure according to the present invention, the main winding 23 and the sub winding 24 each are directly wound through neighboring slots or groups of adjacent neighboring slots, and skip adjacent neighboring slots or groups of adjacent neighboring slots, in an alternate manner, thereby considerably reducing the coil end. In other words, according to the first embodiment of the present invention, the main winding is directly wound through neighboring slots, and skips adjacent neighboring slots, in an alternate manner, while the sub winding is directly wound through the neighboring slots which the main winding skipped, and skips those neighboring slots which are wound by the main winding.

Accordingly, and has been determined in test results, the coil end may be reduced by about one fifth (⅕) in comparison with the prior art. Accordingly, not only the material cost, but also the use of excessive copper can be reduced. In addition, according to the present invention, the winding does not protrude from opposite sides of the stator 21. Therefore, while finishing processes like forming, lacing and cleaning were required for the conventional distributed winding method to clean the portions of the winding which protrude from the opposite sides of the stator 21, the present invention has no windings protruding from the opposite sides of the stator 21 and thus requires no additional processes for finishing purposes like forming, lacing and cleaning. As a result, the manufacturing process becomes simpler, and productivity increases.

Figure 7:
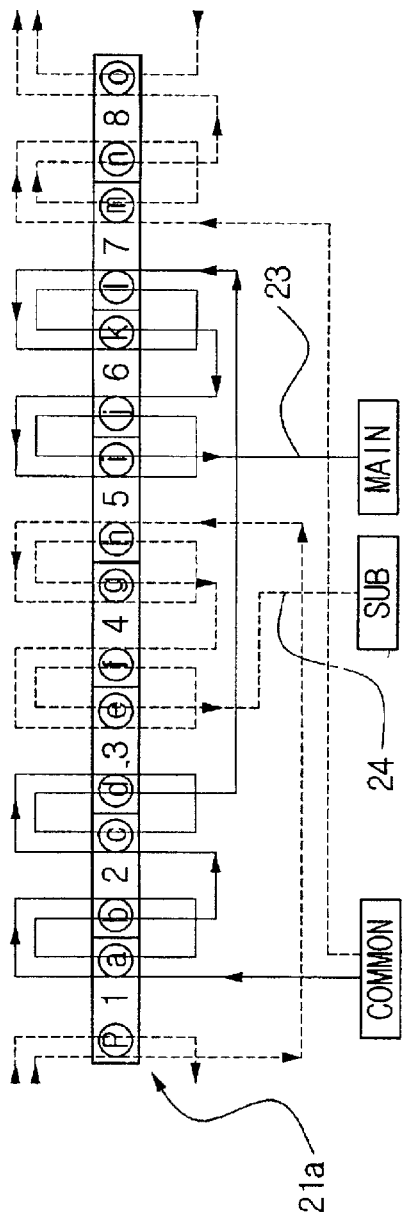
FIG. 7 is a diagram explaining a method of winding in a stator of the single phase induction motor for use in a compressor according to a second preferred embodiment of the present invention.

FIG. 7 is a diagram explaining a method of winding in a stator of the single-phase induction motor for use in a compressor according to the second preferred embodiment of the present invention.

According to the second preferred embodiment of the present invention, the single-phase induction motor has an almost identical structure as that of the first preferred embodiment, except for the order by which the main winding 23 and the sub winding 24 are wound.

The main winding 23 and the sub winding 24 according to the second preferred embodiment are each wound through a group of two adjacent neighboring slots of each of the sixteen slots 21a of the stator 21 and skip the adjacent groups of two adjacent neighboring slots, in an alternating manner, the main winding and the sub winding also alternating from each other the groups of two neighboring slots which are wound. That is, the main winding 23 is inserted into slot (1a) of the stator 21, then passed consecutively through slots(2b), (2c), (3d), (7l), (6k), (6j), (5i), and then drawn out, while the sub winding 24 is inserted into slot (7m) of the stator 21, then passed consecutively through slots (8n), (8o), (1p), (5h), (4g), (4f), (3e), and then drawn out.

Figure 8:
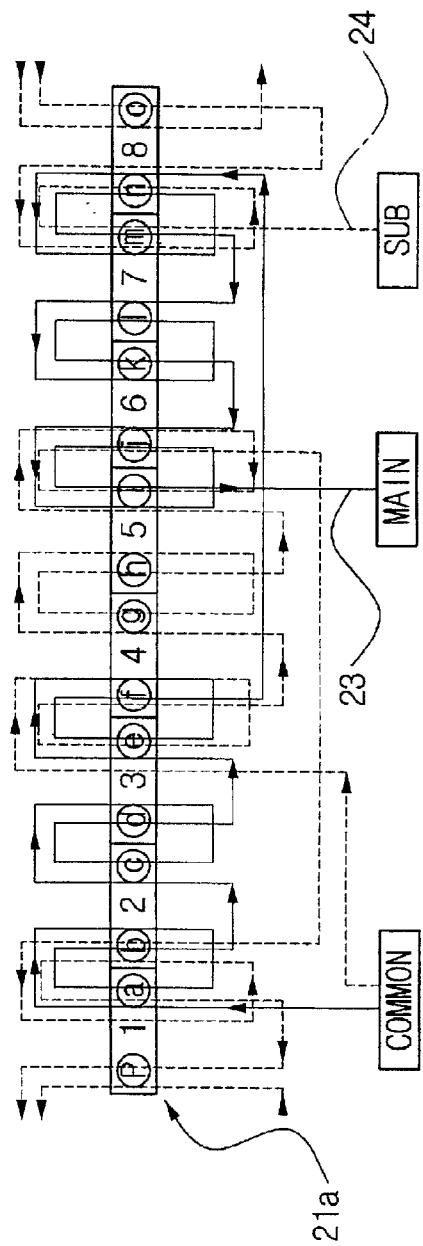
FIG. 8 is a diagram explaining a method of winding in a stator of the single-phase induction motor for use in a compressor according to a third preferred embodiment of the present invention.

FIG. 8 is a diagram explaining a method of winding in a stator of the single-phase induction motor for use in a compressor according to the third preferred embodiment of the present invention.

As shown in FIG. 8, in the single-phase induction motor according to the third preferred embodiment of the present invention, the main winding 23 and the sub winding 24 each are wound through a group of three adjacent neighboring slots of the slots 21a of the stator 21, and skip the adjacent neighboring three slots, with the main winding 23 and the sub winding 24 overlapping at alternating neighboring slots.

That is, the main winding 23 is inserted into slot (1a) of the stator 21, and then passed consecutively through slots (2b), (2c), (3d), (3e), (4f), (8n), (7m), (7l), (6k), (6j),(5i) and then drawn out, while the sub winding 24 is inserted into slot (3e) of the stator 21, then passed consecutively through slots (4f), (4g), (5h), (5i), (6j), (2b), (1a), (1p), (8o), (8n), (7m), and then drawn out.

Except for the winding order and method of the main winding 23 and the sub winding 24, the construction and effect of the single-phase induction motor according to the first, second, and third embodiments are identical to one another.

The hermetic reciprocal compressor according to the present invention is almost identical to the general hermetic reciprocal compressor in construction, except for the fact that the hermetic reciprocal compressor according to the present invention has the single-phase induction motor having the above-described construction. Accordingly, a description of this identical construction is omitted.

According to the present invention, since the main winding 23 and the sub winding 24 are wound through the slots 21a of the stator 21, without protruding excessively, finishing processes like forming, lacing and cleaning the protruded portions of the main winding 23 and the sub winding 24 can be omitted, and accordingly, the manufacturing process becomes simpler and more convenient, and productivity increases.

Also, if the single-phase induction motor according to the present invention is employed in a hermetic reciprocal compressor, since neither the main winding 23 nor the sub winding protrude from the opposite sides of the stator 21 considerably, an advantage of size-reduction of the compressor can also be expected.

What is claimed is:

1. A single-phase induction motor, comprising:
   a stator having a plurality of slots;
   a rotor being rotated by a magnetic field generated by an electric force between the stator and the rotor, the rotor further comprising skews formed at a pitch identical to the pitch of the slots of the stator;
   a main winding and a sub winding, respectively wound through the plurality of slots of the stator,
   wherein said main winding and said sub winding are wound in a centralized winding structure such that said main winding and said sub winding are directly wound through neighboring slots or groups of adjacent neighboring slots, and skip neighboring slots or groups of alternate neighboring slots, in an alternating manner.

2. The single phase induction motor of claim 1, wherein a stator winding is wound through said plurality of slots of the stator to thereby provide a means for generating a magnetic field through an interaction with the electric force of the stator.

3. The single phase induction motor of claim 1, wherein each skew of the rotor is in a shape of the alphabet symbol 'I'.

4. The single phase induction motor of claim 1, wherein each skew of the rotor is in a shape of the alphabet symbol 'V'.

5. The single phase induction motor of claim 1, wherein
the main winding is directly wound through neighboring slots, and skips adjacent neighboring slots, in an alternate manner, and the sub winding is directly wound through the neighboring slots which the main winding skipped, and the sub winding skips those neighboring slots which are wound by the main winding.

6. The single phase induction motor of claim 1, wherein
the main winding is directly wound through a group of two adjacent neighboring slots, and skips the adjacent groups of two adjacent neighboring slots, in an alternating manner, and, the sub winding is directly wound through the group of two neighboring slots which the main winding skipped, and the sub winding skips those groups of two neighboring slots which are wound by the main winding.

7. The single phase induction motor of claim 1, wherein the stator has 16 slots.

8. A single-phase induction motor, comprising:
a stator having a plurality of slots;
a rotor being rotated by a magnetic field generated by an electric force between the stator and the rotor;
a main winding and a sub winding, respectively wound through the plurality of slots of the stator,
wherein the main winding is directly wound through a group of three adjacent neighboring slots, and skips the adjacent neighboring slots, in an alternating manner, and
the sub winding is directly wound through a group of three neighboring slots and skips the adjacent neighboring slots such that the main winding and sub winding overlap at alternating nighboring slots.

9. A hermetic type reciprocal compressor, comprising:
a single phase induction motor, and
a compression portion for compressing refrigerant by linearly reciprocating by a driving force from the single phase induction motor, the single phase induction motor and the compression portion both being provided in a sealed casing,
the single phase induction motor, having:
a stator having a plurality of slots;
a rotor being rotated by a magnetic field generated by an electric force between the stator and the rotor;
a main winding and a sub winding, respectively wound through the plurality of slots of the stator,
wherein said main winding and said sub winding are wound in a centralized winding structure such that said main winding and said sub winding are directly wound through neighboring slots or groups of adjacent neighboring slots and skip neighboring slots or groups of alternate neighboring slots, in an alternate manner, and wherein the rotor further comprises skews formed at a pitch identical to a pitch of the slots of the stator.

10. A hermetic type reciprocal compressor as claimed in claim 9, wherein
the main winding is directly wound through neighboring slots and skips adjacent neighboring slots, in an alternate manner, and the sub winding is directly wound through the neighboring slots which was skipped by the main winding, and the sub winding skips those neighboring slots which are wound by the main winding.

11. A hermetic type reciprocal compressor as claimed in claim 9, wherein
the main winding is directly wound through a group of two adjacent neighboring slots, and skips the adjacent groups of two adjacent neighboring slots, in an alternating manner, and, the sub winding is directly wound through the group of two neighboring slots which was skipped by the main winding, and the sub winding skips those groups of two neighboring slots which are wound by the main winding.

12. A hermetic type reciprocal compressor as claimed in claim 9, wherein
the main winding is directly wound through a group of three adjacent neighboring slots and skips the adjacent neighboring slots, in an alternating manner, and, the sub winding is directly wound through a group of three neighboring slots and skips the adjacent neighboring slots such that the main winding and the sub winding overlap at alternating neighboring slots.

13. A hermetic type reciprocal compressor as claimed in claim 9, wherein
a stator winding is wound through said plurality of slots of the stator to thereby provide a means for generating a magnetic field through an interaction with the electric force of the stator.

14. A hermetic type reciprocal compressor as claimed in claim 9, wherein each skew of the rotor is in a shape of the alphabet symbol 'I'.

15. A hermetic type reciprocal compressor as claimed in claim 9, wherein each skew of the rotor is in a shape of the alphabet symbol 'V'.

16. A hermetic type reciprocal compressor as claimed in claim 9, wherein the stator has 16 slots.

* * * * *